(12) United States Patent
Roth

(10) Patent No.: US 6,367,688 B1
(45) Date of Patent: Apr. 9, 2002

(54) SOLDERING PLIERS CONSTRUCTION

(76) Inventor: Jeffrey A. Roth, 2070 Guth Rd., Allentown, PA (US) 18104

( * ) Notice: Subject to any disclaimer, the term of this patent is extended or adjusted under 35 U.S.C. 154(b) by 0 days.

(21) Appl. No.: 09/412,945

(22) Filed: Oct. 5, 1999

(51) Int. Cl.[7] .................................................. B23K 3/06
(52) U.S. Cl. .......................... 228/212; 228/57; 219/230
(58) Field of Search ............................. 228/212, 51, 52, 228/53, 57; 219/230, 225, 226, 231, 533, 229; 81/345, 383

(56) References Cited

U.S. PATENT DOCUMENTS

| 466,520 | A | * | 1/1892 | Cook et al. | |
|---|---|---|---|---|---|
| 1,519,127 | A | * | 12/1924 | Gaffney | |
| 2,251,557 | A | * | 8/1941 | Weston | |
| 2,751,485 | A | * | 6/1956 | Sauer | |
| 3,339,059 | A | | 8/1967 | Spinka | 219/243 |
| 3,412,233 | A | * | 11/1968 | Wilkie | |
| 3,580,462 | A | | 5/1971 | Vanyi | |
| 4,046,148 | A | | 9/1977 | Meador | 128/303.1 |
| 4,205,221 | A | * | 5/1980 | Meyer | |
| 4,415,116 | A | * | 11/1983 | Norton | |
| 4,965,433 | A | * | 10/1990 | Hanke et al. | |
| 4,967,059 | A | * | 10/1990 | Wagner | |
| 5,309,640 | A | | 5/1994 | Caron | 30/140 |
| 5,472,654 | A | | 12/1995 | Crawford | 264/163 |
| 5,474,637 | A | * | 12/1995 | Soodak | |
| 5,783,800 | A | | 7/1998 | Thompson et al. | 219/225 |

* cited by examiner

Primary Examiner—Tom Dunn
Assistant Examiner—Jonathan Johnson
(74) Attorney, Agent, or Firm—Henderson & Sturm LLP

(57) ABSTRACT

A soldering pliers construction 10 including a pair of pivoted handle members 20, 21 having anvil members 30, 40 provided on their outboard ends. Each of the anvil members 30, 40 are provided with at least one pair of complementary lateral grooves 32, 42 which are dimensioned to receive the abutted ends of two lengths of wire 100, 100' which are to be joined together by a soldered connection. One of the anvil members 30 is provided with a heating element 34 for heating the butted wires 100, 100' and the other anvil member 40 is provided with an aperture 45 that is dimensioned to receive a stick of soldering material 200 that will be melted upon contact with the heated wires 100, 100'.

6 Claims, 1 Drawing Sheet

SOLDERING PLIERS CONSTRUCTION

BACKGROUND OF THE INVENTION

1. Field of the Invention

The present invention relates to the field of soldering devices in general, and in particular to a heated pair of pliers that are adapted to facilitate the soldering of abutted ends of two lengths of wire.

2. Description of Related Art

As can be seen by reference to the following U.S. Pat. Nos. 3,339,059; 4,046,148; 5,309,640; 5,472,654; and 5,783,800, the prior art is replete with myriad and diverse tools that employ one or more heated jaw members designed to heat, cauterize, or singe different items.

While all of the aforementioned prior art constructions are more than adequate for the basic purpose and function for which they have been specifically designed, they are uniformly deficient with respect to their failure to provide a simple, efficient, and practical soldering pliers construction that will grasp and retain the ends of two lengths of wire that are to be joined together by soldering. The molten solder can be introduced through one of the plier jaw members.

As most individuals who have hands on experience with joining lengths of wire by soldering are all too well aware, this is a time consuming process due to the requirement that the ends of the wire must be maintained in an abutting relationship as the molten solder is applied to the juncture of the wires.

As a consequence of the foregoing situation, there has existed a longstanding need for a new and improved soldering pliers construction which can be used to position and align the abutting ends of two lengths of wire. The wires are heated by a heating element connected to one plier jaw while the other wire jaw is adapted to receive a length of solder, and the provision of such a construction is a stated objective of the present invention.

BRIEF SUMMARY OF THE INVENTION

Briefly stated, the soldering pliers construction that forms the basis of the present invention comprises in general a pair of handle units that are pivotally connected to one another wherein the outboard end of each of the handle members are provided with a jaw unit wherein one jaw unit comprises a heat source and the other jaw unit comprises a heat sink.

As will be explained in greater detail further on in the specification, each of the jaw units comprise an anvil member having a plurality of different sized grooves that are dimensioned to receive different sized wires that are to be joined together by a soldered joint.

In addition, one of the anvil members has a heating element contained therein such that this particular jaw unit comprises a heat source whereas the other anvil member is unheated and therefore comprises a heat sink.

Furthermore, the unheated anvil member is provided with a bifurcated connection between the unheated jaw unit and its related handle unit. The space between the bifurcated connection on the unheated anvil member is provided to accommodate a pair of apertures which are in open communication with the grooves in the anvil member and dimensioned to receive a stick of solder material whose lower end will be melted upon contact with the abutted ends of the lengths of wire that are to be joined together by the molten solder material.

This invention also contemplates the provision of a hinged stand unit which will maintain the soldering pliers construction in a safe position wherein the heated jaw unit should not come into contact with a flammable or meltable surface under normal usage.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
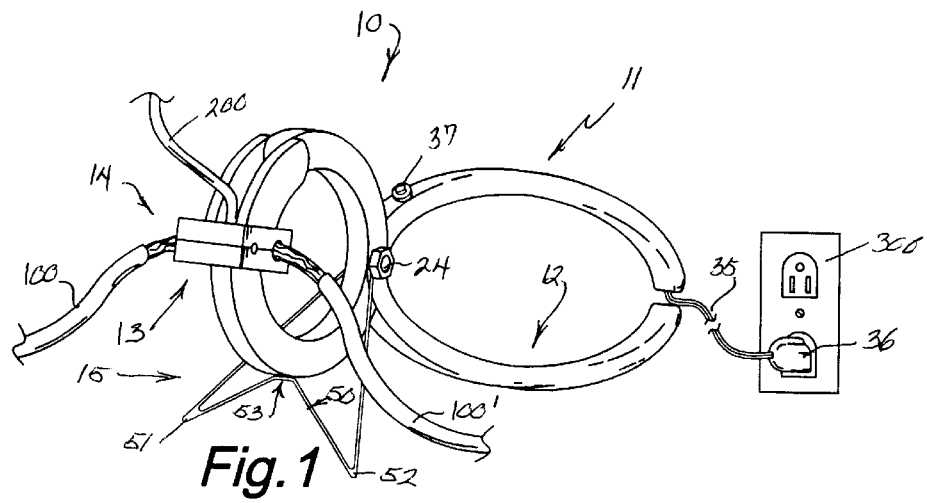
FIG. 1 is a perspective view of the soldering pliers construction in use.

As can be seen by reference to the drawings, and in particular to FIG. 1, the soldering pliers construction that forms the basis of the present invention is designated generally by the reference number 10. The construction 10 comprises in general a pair of handle units 11, 12 wherein the outboard end of one handle unit 11 is provided with a heated jaw unit 13 and the outboard end of the other handle unit 12 is provided with an unheated jaw unit 14. In addition, the construction 10 also includes a pivoted stand unit 15. These units will now be described in seriatim fashion.

Figure 2:
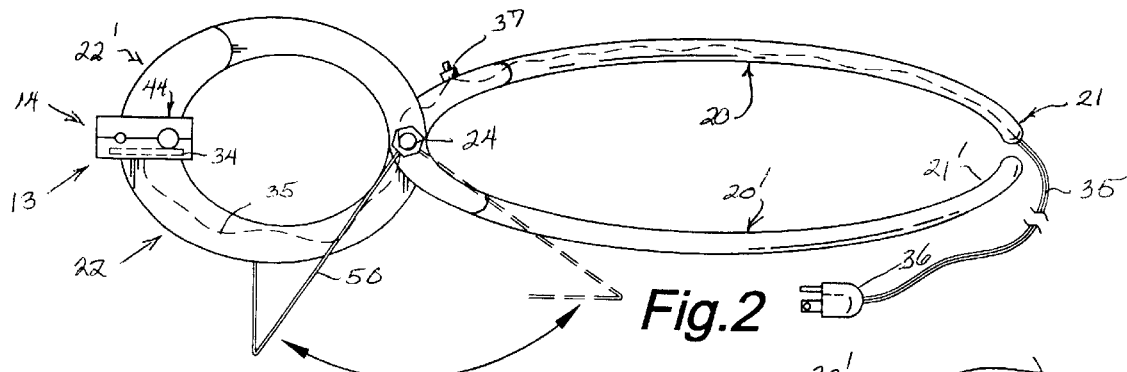
FIG. 2 is a side elevation view of the soldering pliers construction.

As can best be seen by reference to FIGS. 1 and 2, the handle units 11, 12, comprise an upper generally S-shaped elongated handle member 20 having a hollow interior and a lower generally S-shaped elongated handle member 20' have an inboard end 21, 21' and an outboard end 22, 22', respectively.

In addition, the inboard ends 21, 21' of the handle members 20, 20' are provided with a protective covering 23, 23' fabricated from rubber or plastic to improve the user's grip and/or provide heat insulation. The intermediate portion of the handle members 20, 20' are pivotally connected to one another as at 24 and the outboard ends 22, 22' of the handle members 20, 20' are connected to and operatively associated, respectively, with the heated jaw unit 13 and the unheated jaw unit 14 as will be explained next.

Figure 5:
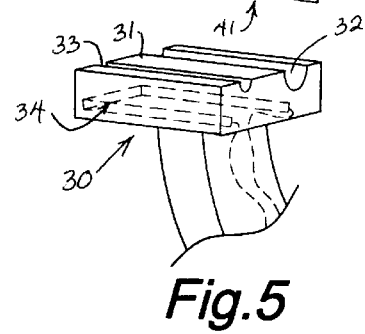
FIG. 5 is an enlarged detail view of the jaw units.

As shown in FIGS. 2 and 5, the heated jaw unit 13 is disposed on the outboard end 22 of the upper handle member 20 and comprises a generally rectangular lower anvil member 30 having a flat upper surface 31 provided with a pair of different sized lateral grooves 32, 33. The interior of the anvil member 30 is hollow and provided with an electrical heating element 34 which is connected by an electrical wire 35 which are threaded through the hollow interior of the upper handle member 20 and which terminates in an electrical plug 36. An on-off switch 37 is further operatively connected to the electrical wire 35 at a suitable location to energize the heating element 34 in a well recognized manner.

Still referring to FIGS. 2 and 5, it can be seen that the unheated jaw unit 14 comprises a generally rectangular upper anvil member 40 having a flat lower surface 41 provided with a pair of different sized lateral grooves 42, 43 which are dimensioned to correspond with the lateral grooves 32, 33 in the lower anvil member 30 to receive the abutting ends of two different diameter stripped lengths of insulated wire 100, 100' as will be explained in greater detail further on in the specification.

Figure 3:
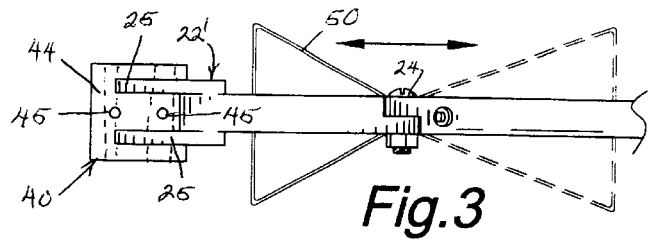
FIG. 3 is a top plan view of the outboard end of the one of the handle units.

Turning now to FIGS. 1, 3, and 5, it can be seen that the outboard end 22' of the lower handle member 20' is bifurcated and includes two arm elements 25, 25 which are spaced from one another to accommodate a pair of apertures 45, 45, disposed along the midline of the upper surface 44 of the unheated anvil member 40 and which communicate with the different sized lateral grooves 43, 43 and are each dimensioned to receive a stick 200 of soldering material.

Figure 4:
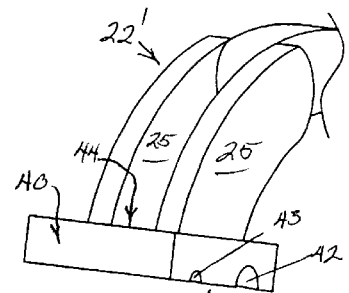
FIG. 4 is a bottom plan view of the outboard end of the other of the handle units.
Figure 4:
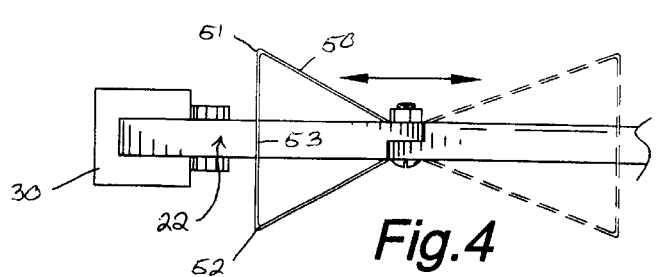

Turning now to FIGS. 2 through 4, it can be seen that the stand unit 15 comprises a wire framework member 50 which is pivotally secured as at 24 to the handle members 20, 20' wherein the intermediate portion of the framework member 50 is configured to form two spaced support legs 51, 52 and a raised support surface 53 for a portion of the outboard end 22 of the upper handle member 20 which is disposed between the support legs 51, 52.

In order to employ the soldering pliers construction 10, the user would first dispose the wire framework member 50 as shown in FIGS. 1 and 2, insert the electrical plug 36 in a conventional electrical outlet 300 and depress the on-off switch to turn on the heating element 34 to heat the lower anvil member 30.

As the lower anvil member 30 is being heated, the heat will be transferred to the abutted ends of two lengths of wire 100, 100' which are inserted into a suitably dimensioned pair of lateral grooves 43, 32 or 43, 33 in the anvil members 40 and 30.

The abutted ends of the lengths of wire will be positioned beneath one of the apertures 45 in the top surface 44 of the upper anvil member 40.

At this juncture, a stick of soldering material 200 will be inserted through the appropriate aperture 45 into contact with the heated wires 100', 100 which will melt the solder to a soldered joint between the abutted ends of the wires 100, 100'.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A soldering pliers construction comprising:
   a pair of handle units including an upper generally S-shaped handle member and a lower generally S-shaped handle member wherein each handle member has an outboard end, an inboard end, and an intermediate portion which is pivotally connected to the other handle member;
   an unheated jaw unit operatively associated with the outboard end of the lower handle member and including a generally rectangular upper anvil member provided with an upper surface provided with at least one aperture dimensioned to receive a stick of solder material and a lower surface provided with at least one lateral groove which is in communication with the at least one aperture; and
   a heated jaw unit operatively associated with the outboard end of the upper handle member and including a generally rectangular lower anvil member provided with an upper surface provided with at least one groove wherein the lower handle member has a hollow interior provided with a heating element and wherein the at least one groove in the lower anvil member and the at least one groove in the upper anvil member are aligned with a complementary to one another; and,
   a stand unit associated with the upper handle member for maintaining the heated jaw unit at an elevated height above a horizontal surface wherein said stand unit includes a wire framework member pivotally associated with the intermediate portion of one of the handle members.

2. The construction as in claim 1 wherein the upper anvil member and the lower anvil member are each provided with a pair of lateral grooves wherein each of the pair of lateral grooves have a different size and are complementary with the lateral grooves formed in the opposed anvil members.

3. The construction as in claim 2 wherein the upper surface of the upper anvil member is provided with a pair of apertures which are aligned with an intersect the pair of lateral grooves in the upper anvil member.

4. The construction as in claim 1 wherein the upper handle member is hollow and is further provided with an electrical wire that is electrically connected to the heating element.

5. The construction as in claim 1 wherein the wire framework member is configured to provide a pair of spaced support legs.

6. The construction as in claim 5 wherein the wire framework unit further includes a raised support surface adapted to engage the outboard end of one of the handle members.

* * * * *